(12) United States Patent
Lv

(10) Patent No.: US 11,554,918 B2
(45) Date of Patent: Jan. 17, 2023

(54) CARRIER BELT AND CARRIER ROLL HAVING THE SAME

(71) Applicant: TRIPLE WIN TECHNOLOGY(SHENZHEN) CO. LTD., Shenzhen (CN)

(72) Inventor: Yi-Bo Lv, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 55 days.

(21) Appl. No.: 17/186,903

(22) Filed: Feb. 26, 2021

(65) Prior Publication Data

US 2022/0055838 A1 Feb. 24, 2022

(30) Foreign Application Priority Data

Aug. 18, 2020 (CN) .......................... 202010833983.2

(51) Int. Cl.
*B65G 15/30* (2006.01)
(52) U.S. Cl.
CPC ..................................... *B65G 15/30* (2013.01)
(58) Field of Classification Search
CPC ........ B65G 15/30; B65D 85/67; B65F 85/671
See application file for complete search history.

(56) References Cited

U.S. PATENT DOCUMENTS 6,635,343 B2 * 10/2003 Inoue .......................... C09J 7/22
428/521
2021/0127533 A1 * 4/2021 Shimizu ............. H05K 13/0084

FOREIGN PATENT DOCUMENTS

| CN | 112938161 A | * | 6/2021 |
| JP | 08198318 A | * | 8/1996 |
| JP | 388742 B | * | 10/1998 |

* cited by examiner

*Primary Examiner* — Gene O Crawford
*Assistant Examiner* — Lester Ill Rushin
(74) *Attorney, Agent, or Firm* — ScienBiziP, P.C.

(57) ABSTRACT

A carrier belt for loading materials includes a carrier body, a protective film on a mounting surface of the carrier body, and at least one dividing strip sandwiched between the protective film and the carrier body, thereby spacing protective film from the carrier body to form a gap. The mounting surface comprises a plurality of loading areas to carry the materials and at least one non-loading area. The at least one dividing strip is arranged on the on the non-loading area, a height of the gap is greater than a thickness of each of the materials. A carrier roll is also provided.

20 Claims, 3 Drawing Sheets

CARRIER BELT AND CARRIER ROLL HAVING THE SAME

FIELD

The subject matter herein generally relates to a carrier belt and a carrier roll having the same.

BACKGROUND

During the storage and transportation of materials (for example, conductive patches), the material usually needs to be attacked to a carrier belt at intervals, and then the carrier belt is wound on a carrier pulley to protect the materials. However, the materials can be easily damaged by a friction between the carrier belt and the materials.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
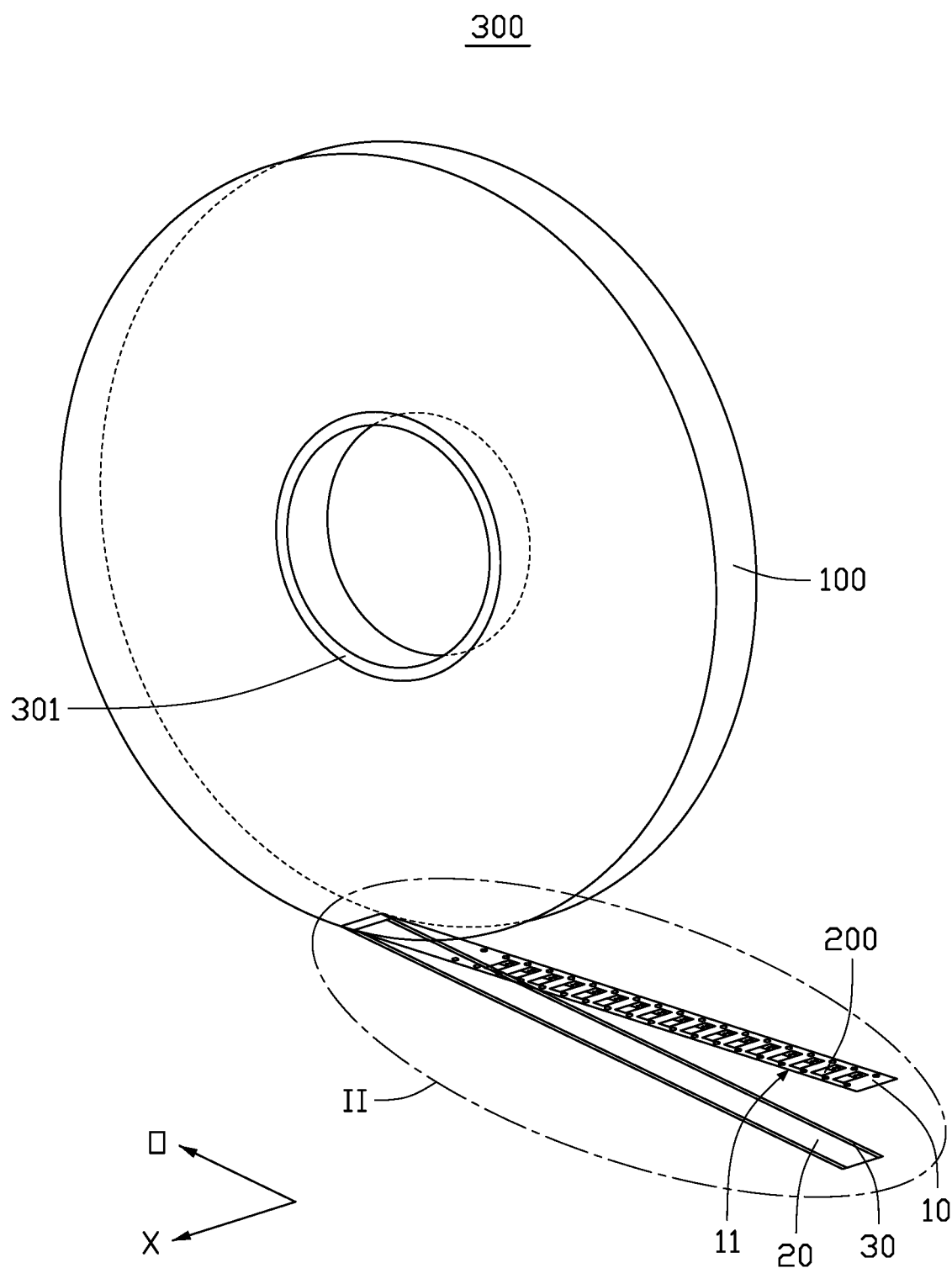
FIG. 1 is a diagram of an embodiment of a carrier roll.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIG. 1 illustrates an embodiment of a carrier roll 300 having a carrier belt 100 for loading materials 200. The carrier belt 100 includes a carrier body 10, a protective film 20 arranged on a surface of the carrier body 10, and at least one dividing strip 30.

Figure 2:
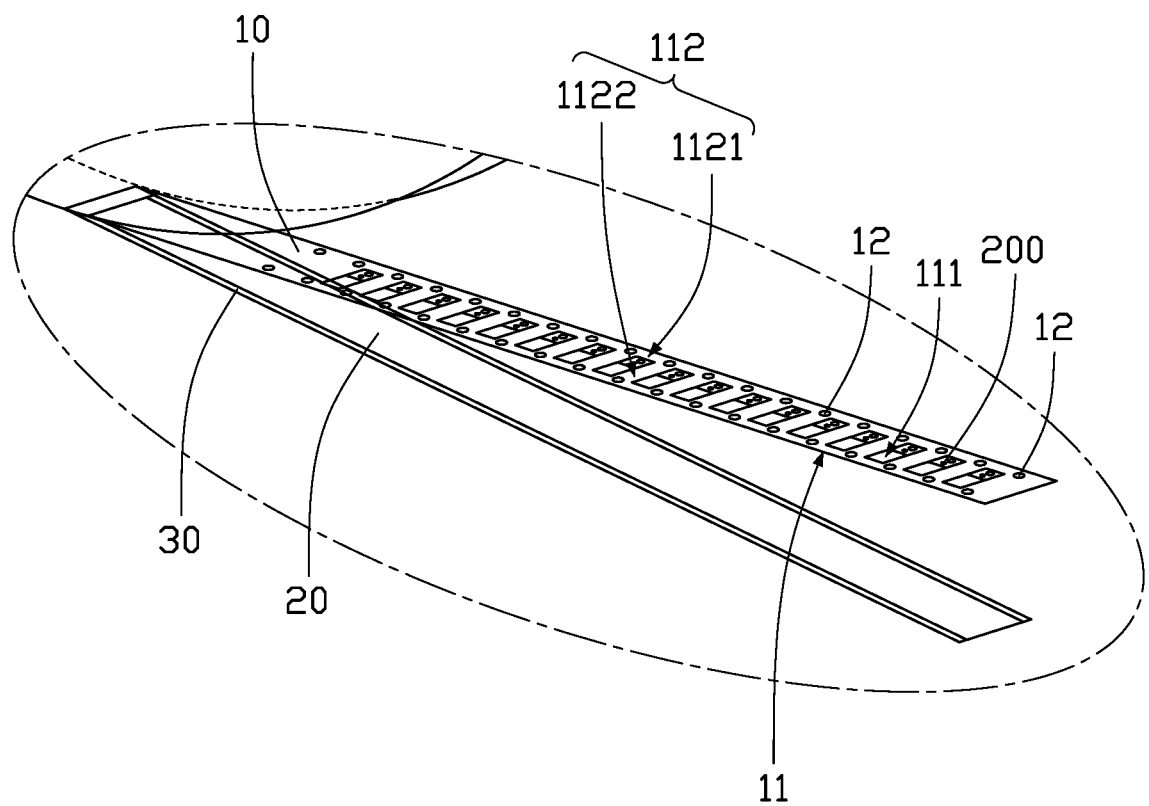
FIG. 2 is an enlarger schematic diagram of a partial area II of the carrier roll of FIG. 1.
Figure 3:
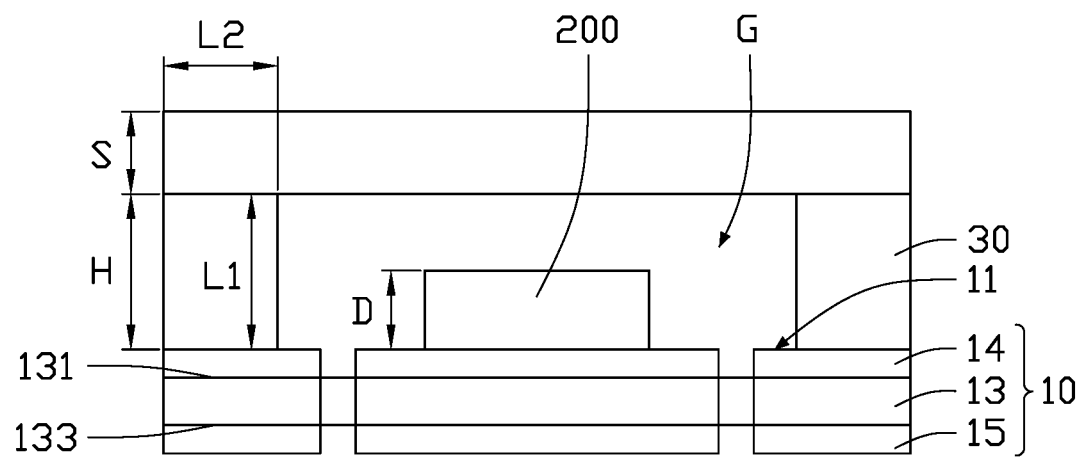
FIG. 3 is a cross-sectional view of a carrier belt along a width direction X of FIG. 1.

The carrier body 10 includes a first surface 11 facing the protective film 20. Referring to FIG. 2, the first surface 11 includes a plurality of loading areas 111 and at least one non-loading area 112. The at least one dividing strip 30 is formed on the non-loading area 112, and sandwiched between the carrier body 10 and the protective film 20, thereby forming a gap G between the loading areas 111 and the protective film 20.

The materials 200 is carried by the loading areas 111. A height (labelled as H) of the gap G is greater than a thickness (labelled as D) of each of the materials 200. So that the position of the materials 200 on the loading areas 111 may be prevented from shifting.

In at least one embodiment, the carrier belt 100 has an extension direction O. The plurality of loading areas 111 are distributed on the first surface 11 at intervals along the extension direction O.

In at least one embodiment, the at least one non-loading area 112 includes an inner non-loading area 1121 located between every two adjacent loading areas 111 and two outer non-loading areas 1122 located on opposite sides of the plurality of loading areas 111 along a width direction X perpendicular to the extension direction O.

In at least one embodiment, the carrier belt 100 includes two dividing strips 30. Each dividing strip 30 is arranged on one of the outer non-loading areas 1122 along the extension direction O. So that the dividing strips 30 are respectively arranged on the outer non-loading areas 1122.

In at least one embodiment, a side of each of the dividing strips 30 facing away from the plurality of loading areas 111 may be flush with the edge of the first surface 11.

In at least one embodiment, each of the plurality of loading areas 111 may be substantially rectangular. The plurality of loading areas 111 is a central area of the first surface 11, the outer non-loading areas 1122 are edge areas of the first surface 11, and symmetrically distributed on opposite sides of the loading areas 111.

In at least one embodiment, a plurality of positioning holes 12 is formed on each outer non-loading area 1122, and located between the adjacent dividing strip 30 and the plurality of loading areas 111. The plurality of positioning holes 12 on the same outer non-loading area 1122 are equally spaced. The plurality of positioning holes 12 on one of the outer non-loading areas 1122 corresponds to the plurality of positioning holes 12 on the other outer non-loading area 1122. When a peeling mechanism (not shown, such as a robotic arm) is used to peel the materials 200, the positioning hole 12 may be used to assist a recognition system (not shown) on the robotic arm to accurately locate the position of the materials 200.

The dividing strip 30 may be made of polyethylene composites. The material 200 may be a die-cutting material such as a lens protective film, a pressure sensitive adhesive (PSA).

A thickness (labelled as S) of the protective film 20 may be in a range of 0.01 mm to 0.08 mm. A thickness (labelled as L1) of each dividing strip 30 may be in a range of 0.19 mm to 0.21 mm. a width (labelled as L2) of each dividing strip 30 may be in a range of 2.1 mm to 2.5 mm.

In at least one embodiment, the carrier body 10 may include a substrate 13, a carrier layer 14 formed on a first side 131 of the substrate 13, and a reinforcement layer 15 formed on a second side 133 of the substrate 13 facing away from the first side 131.

A surface of the carrier layer 14 facing away from the substrate 13 is the first surface 11. The carrier layer 14 may be bonded to the substrate 13 by a PU glue. The reinforcement layer 15 may be bonded to the substrate 13 by a PU glue. The carrier layer 14 is used to carry the materials 200, and the reinforcement layer 15 is used to enhance a strength of the carrier body 10.

In at least one embodiment, the substrate 13 may be made of a material including at least one of polyester resin and polyimide. The carrier layer 14 may be made of a material including polyethylene glycol terephthalate. The reinforcement layer 15 may be made of a material including polyethylene glycol terephthalate.

In at least one embodiment, at least one of the substrate 13, the carrier layer 14, and the reinforcement layer 15 includes an antistatic material, thereby providing an antistatic to increase a safety of the materials 200. The antistatic material includes a polyurethane antistatic agent.

The carrier roll 300 further includes a reel 301. The carrier belt 100 is wound on the reel 301.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A carrier belt for loading materials comprising:
a carrier body;
a protective film on a mounting surface of the carrier body; and
at least one dividing strip sandwiched between the protective film and the carrier body, thereby spacing protective film from the carrier body to form a gap;
wherein the mounting surface comprises a plurality of loading areas to carry the materials and at least one non-loading area, the at least one dividing strip is arranged on the non-loading area, a height of the gap is greater than a thickness of each of the materials; the carrier body comprises a substrate, a carrier layer on a first side of the substrate, the mounting surface is a surface of the carrier layer facing away from the substrate.

2. The carrier belt of claim 1, wherein the carrier belt extends in an extension direction, the plurality of loading areas are distributed on the mounting surface at intervals along the extension direction; the at least one non-loading area includes an inner non-loading area located between every two adjacent loading areas and two outer non-loading areas located on opposite sides of the plurality of loading areas along a width direction perpendicular to the extension direction, a number of the at least one dividing strip are two, the dividing strips are respectively arranged on the outer non-loading areas.

3. The carrier belt of claim 2, wherein each of the dividing strips is arranged on one of the outer non-loading areas along the extension direction.

4. The carrier belt of claim 3, wherein a side of each of the dividing strips facing away from the plurality of loading areas is flush with an edge of the mounting surface.

5. The carrier belt of claim 2, wherein a plurality of positioning holes is defined on each outer non-loading area and located between the adjacent dividing strip and the plurality of loading areas, the plurality of positioning holes on the same outer non-loading area are equally spaced, and the plurality of positioning holes on one of the outer non-loading areas corresponds to the plurality of positioning holes on the other outer non-loading area.

6. The carrier belt of claim 1, wherein a thickness of the protective film is in a range of 0.01 mm to 0.08 mm.

7. The carrier belt of claim 6, wherein a thickness of each of the at least one dividing strip is in a range of 0.19 mm to 0.21 mm.

8. The carrier belt of claim 6, wherein a width of each of the at least one dividing strip is in a range of 2.1 mm to 2.5 mm.

9. The carrier belt of claim 1, wherein a reinforcement layer on a second side of the substrate facing away from the first side.

10. The carrier belt of claim 9, wherein the carrier layer is bonded to the substrate, and the reinforcement layer is bonded to the substrate.

11. A carrier roll comprising a reel and a carrier belt wound on the reel, the carrier belt for loading materials comprising:
a carrier body;
a protective film on a mounting surface of the carrier body;
at least one dividing strip sandwiched between the protective film and the carrier body, thereby spacing protective film from the carrier body to form a gap;
wherein the mounting surface comprises a plurality of loading areas to carry the materials and at least one non-loading area, the at least one dividing strip is arranged on the non-loading area, a height of the gap is greater than a thickness of each of the materials; the carrier body comprises a substrate, a carrier layer on a first side of the substrate, the mounting surface is a surface of the carrier layer facing away from the substrate.

12. The carrier roll of claim 11, wherein the carrier belt extends in an extension direction, the plurality of loading areas are distributed on the mounting surface at intervals along the extension direction; the at least one non-loading area includes an inner non-loading area located between every two adjacent loading areas and two outer non-loading areas located on opposite sides of the plurality of loading areas along a width direction perpendicular to the extension direction, a number of the at least one dividing strip are two, the dividing strips are respectively arranged on the outer non-loading areas.

13. The carrier roll of claim 12, wherein each of the dividing strips is arranged on one of the outer non-loading areas along the extension direction.

14. The carrier roll of claim 13, wherein a side of each of the dividing strips facing away from the plurality of loading areas is flush with an edge of the mounting surface.

15. The carrier roll of claim 12, wherein a plurality of positioning holes is defined on each outer non-loading area and located between the adjacent dividing strip and the plurality of loading areas, the plurality of positioning holes on the same outer non-loading area are equally spaced, and the plurality of positioning holes on one of the outer non-loading areas corresponds to the plurality of positioning holes on the other outer non-loading area.

16. The carrier roll of claim 11, wherein a thickness of the protective film is in a range of 0.01 mm to 0.08 mm.

17. The carrier roll of claim 16, wherein a thickness of each of the at least one dividing strip is in a range of 0.19 mm to 0.21 mm.

18. The carrier roll of claim 16, wherein a width of each of the at least one dividing strip is in a range of 2.1 mm to 2.5 mm.

19. The carrier roll of claim 11, wherein a reinforcement layer on a second side of the substrate facing away from the first side.

20. The carrier roll of claim 19, wherein the carrier layer is bonded to the substrate, and the reinforcement layer is bonded to the substrate.

\* \* \* \* \*